July 8, 1969      F. V. PONTERIO      3,453,893

FLUID OPERATED ACCELEROMETER

Filed May 25, 1966

RECEIVER FLOW—NO ACCELERATION

RECEIVER FLOW—UNIDIRECTIONAL ACCELERATION

INVENTOR.
FRANK V. PONTERIO

BY

United States Patent Office 3,453,893
Patented July 8, 1969

---

3,453,893
FLUID OPERATED ACCELEROMETER
Frank V. Ponterio, Staten Island, N.Y., assignor to Sperry Rand Corporation, Ford Instrument Company Division, Long Island City, N.Y., a corporation of Delaware
Filed May 25, 1966, Ser. No. 552,808
Int. Cl. G01p *15/00*
U.S. Cl. 73—515                                     8 Claims

ABSTRACT OF THE DISCLOSURE

A fluid oscillator is used to sense accelerations by making the oscillator flow splitter pendulous. Motion of the pendulous splitter in response to acceleration modulates the length of the pulses so that the pulses in one output channel of the oscillator become longer and the pulses in the other output channel become shorter in response to accelerations.

---

This invention relates to acceleration measuring instruments and more particularly to an instrument of this type which is fluid operated and produces a readily integrated fluid output related to acceleration.

Fluid force balance accelerometers of the prior art utilize a continuously variable fluid force derived from the impingement of a fluid jet on the surface of a proof mass much in the same manner as a flapper nozzle valve. The pressure distribution upstream of the nozzle produces a fluid output proportional to acceleration. This type of prior art devices requires a proof mass which is mounted for translational motion.

In order to achieve good accuracy and sensitivity the proof mass of these prior art devices is supported on fluid bearings. The latter require accurately machined surfaces resulting in high costs of manufacture.

The aforesaid type of prior art device produces an analog pressure signal proportional to acceleration along the measuring axis. For many applications it is necessary to integrate this acceleration signal to obtain velocity or distance indications. Unfortunately, the present state of the fluid art is such that it is difficult to integrate an analog fluid signal without losing accuracy.

In the accelerometer of the instant invention, to be hereinafter described, there is a single mechanical moving part which is free to pivot over a limited range on pivot bearings. Very low friction pivot bearings of this type may be provided without incurring excessive expense, such as the expense of machining sliding contact surfaces to high accuracy. The low friction pivot bearings for the single moving part of the instant invention results in good sensitivity.

Both analog and digital type outputs can readily be obtained from the fluid signal produced by the accelerometer of the instant invention. The analog output is a flow or pressure proportional to acceleration along the measuring axis while the digital output consists of a pulse length modulated flow or pressure signal, with pulse length being a function of acceleration. As is well known to the art pulse length modulated signals may be integrated accurately and conveniently by known fluid components.

Accordingly, a primary object of the instant invention is to provide a novel fluid accelerometer which produces a readily integrated fluid output.

Another object is to provide an accelerometer of this type having a single movable member pivotally mounted on a mechanical pivot.

Still another object is to provide an accelerometer of this type which produces both analog and pulse length modulated outputs.

A further object is to provide an accelerometer of this type having the general configuration of a fluid jet oscillator and including a pivoted, pendulous, oscillating splitter.

A still further object is to provide an accelerometer of this type which derives a rebalance torque through the interaction of a bistable jet and a mass mounted to a mechanical pivot means.

These as well as other objects of this invention will become readily apparent after reading the following description of the accompanying drawings in which.

Figure 1:
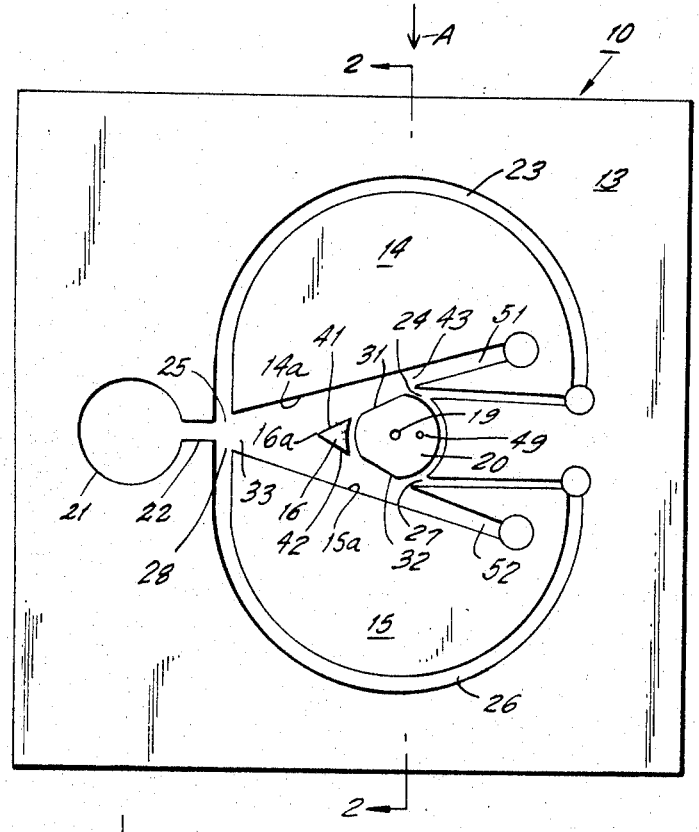
FIGURE 1 is a cross-section of a fluid operated accelerometer constructed in accordance with the teachings of the instant invention taken through line 1—1 of FIGURE 2 looking in the direction of arrows 1—1.

Now referring to the figures. Fluid accelerometer 10 includes plate-like cover sections 11, 12 between which the fluid passage forming elements are sandwiched. These elements are best seen in FIGURE 1 and include stationary plate-like sections 13 through 16, inclusive and single movable plate-like section 20.

Sections 11 through 16 are secured together by suitable fastening means (not shown) known to the art. Input chamber 21 and nozzle or orifice 22 are formed in section 13. Confronting, generally parallel, edge surfaces of sections 13, 14 cooperate to define fluid feedback passage 23 extending from input port 24 to control port 25. Similarly, confronting, generally parallel, edge surfaces of sections 13 and 15 cooperate to define fluid feedback passage 26 extending from entrance port 27 to control port 28. Section 20 is disk-like having a relatively short arcuate section confronting a complementary edge of section 16 and a relatively long arcuate section facing a complementary edge of section 13. These long and short arcuate sections are diametrically opposed. Straight edge sections 31, 32 connect the ends of the short arcuate section to the ends of the long arcuate section.

Figure 2:
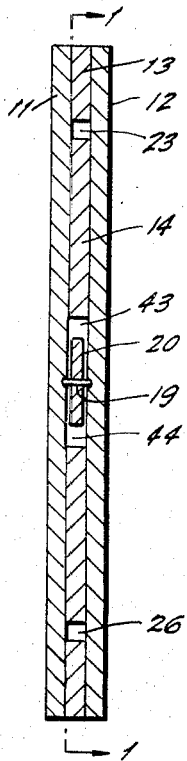
FIGURE 2 is a cross-section taken through line 2—2 of FIGURE 1 looking in the direction of arrows 2—2.

Section 16 is generally triangular and is provided with pointed tip 16a serving as a divider facing orifice 22 and symmetrically disposed with respect to the arcuate side of section 16. The area between sharp edge 16a and orifice 22 is designated as mixing region or chamber 33 which is partially bounded by straight edge portion 14a, 15a of sections 14, 15, respectively. Chamber walls 14a, 15a diverge from orifice 22 in the direction of pivot 19 for pendulous member 20. The latter is designated as a pendulous oscillating splitter and its center of gravity is located at 49 rather than at pivot 19 for reason which will hereinafter become obvious. Both arcuate edge sections of splitter 20 have pivot 19 as a center. As best seen in FIGURE 2, pivot 19 is a pin extending through and at rigth angles to the plane of splitter 20 with the ends of pivot 19 being pointed and extending into aligned bearing depressions in the inner surfaces of covers 11, 12.

Edge walls 41, 51 of sections 16, 14, respectively, confront wall 14a and in combination with wall 31 define receiver 43. Similarly, edge walls 42, 52 of sections 16, 15, respectively, confront wall 15a and in cooperation with edge wall 32 define receiver 44. Fluid signals are taken from receivers 43, 44 through apertures (not shown) in one of the cover plates 11, 12 connects with chamber 21 for the introduction of fluid under pressure into chamber 21. This fluid is directed through orifice 22 exiting into mixing chamber 33 as a jet directed toward sharp edge 16a. However, since walls 14a, 15a diverge away from orifice 22 the jet attaches to one of these walls as in a conventional bistable jet amplifier. Therefore, fluid flows into one or the other of the receivers 43, 44.

Figure 3:
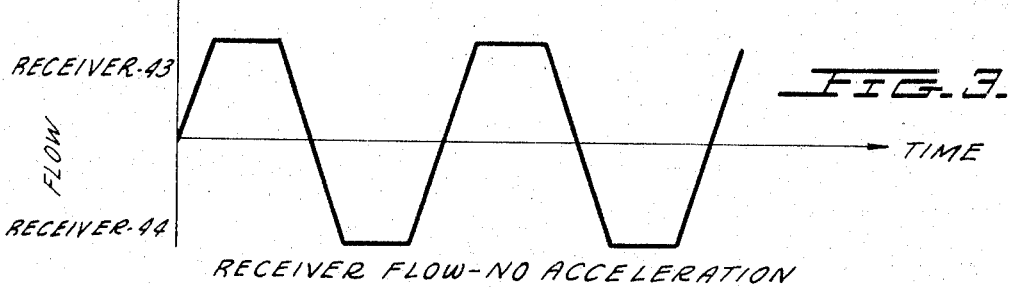
FIGURES 3 and 4 are receiver flow diagrams. The diagram of FIGURE 3 results from operation when no acceleration forces are present while the diagram of FIGURE 4 is a result of unidirectional acceleration.

Assuming that the jet attaches to wall 14a, the momentum of the moving fluid impinging on edge 31 of splitter 20 produces a torque tending to rotate splitter 20 in a clockwise direction with respect to FIGURE 1. Once splitter 20 rotates sufficiently to uncover entrance port 24 some fluid is diverted from receiver 43 through feedback passage 23 to control port 25 thereof into mixing chamber 33. The momentum of this feedback flow acts transverse to the jet issuing from orifice 22 deflecting the jet so that it finally attaches to wall 15a. Now fluid flow is into receiver 44. The momentum of the moving fluid impinging on edge 32 of splitter 20 produces a torque tending to rotate splitter 20 in a counterclockwise direction. When splitter 20 moves sufficiently to open input port 27 some fluid is diverted from receiver 44 through feedback passage 26 to control port 28 thereof into mixing chamber 33. The momentum of this feedback flow switches the jet from orifice 22 so that the jet again attaches to wall 14a. This process is repeated continuously resulting in an oscillating motion of splitter 20 about its center position shown in FIGURE 1. With no acceleration applied to accelerometer 10, symmetrical, equal length, pulsating flows occur in receivers 43, 44 (see FIGURE 3).

The measuring axis for accelerometer 10 extends perpendicular to pivot 19 and at right angles to a line extending through the center of orifice 22, sharp tip 16a, pivot 19 and center of gravity 49 when splitter 20 is in the center position shown in FIGURE 1. If an acceleration is experienced along the measuring axis in the direction indicated by arrow A in FIGURE 1, an inertial reaction force is exerted on splitter 20 acting through its center of gravity 49. Since center of gravity 49 and pivot 19 are not coincident splitter 20 is subjected to a counterclockwise inertial torque.

Figure 4:
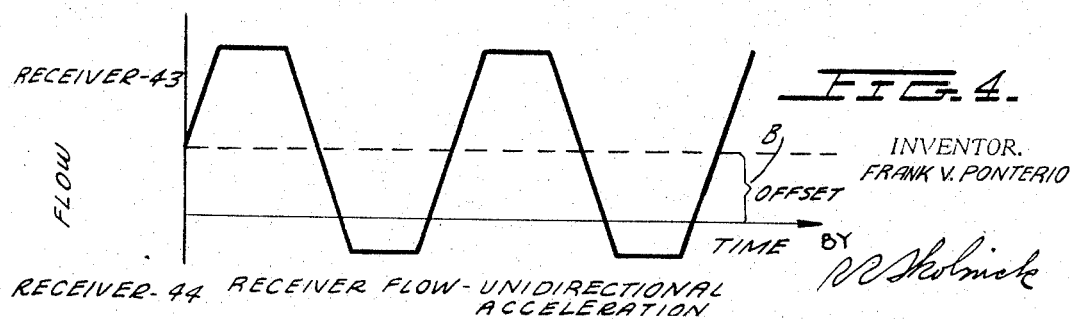

The net torque acting on splitter 20 in the counterclockwise direction is the sum of this inertial torque and the oscillating fluid torque previously described. The net torque acting on the splitter in the clockwise direction is the difference between the inertial torque and the oscillating fluid torque. As a result splitter 20 oscillates asymmetrically about its center position and the flow pulses in receivers 43, 44 are no longer of equal length, with duration of flow through receiver 43 increasing and duration of flow through receiver 44 decreasing (see FIGURE 4).

The difference in these flow durations is proportional to the magnitude of input acceleration. An analog measure of acceleration is obtained by extracting the offset level B (see FIGURE 4) through filtering. A pulse length modulated measure of acceleration is obtained by detecting the difference between the flow duration in receiver 43 and that in receiver 44. The latter yields a time increment proportional to acceleration. This output can readily be integrated, for example, by using the output to gate a bi-directional counter fed by a fixed frequency oscillator.

Thus, the instant invention provides a novel construction for an accurate relatively economical fluid operated accelerometer. The accelerometer of the instant invention utilizes a single moving member mounted to a mechanical pivot and produces an output related to acceleration in such form that this output may readily be converted to analog signals or may readily be integrated for desired purposes.

Although there has been described a preferred embodiment of this novel invention, many variations and modifications will now be apparent to those skilled in the art. Therefore, this invention is to be limited, not be the specific disclosure herein, but only by the appending claims.

What I claim is:
1. An accelerometer including a mixing chamber, a pendulous splitter, a pivot for said splitter, an orifice through which a fluid jet is directed across said chamber toward said pivot, first and second receivers separated by said splitter, means defining first and second fluid feedback paths having respective first and second input ports and respective first and second control ports; said chamber including first and second boundary walls diverging from said orifice toward said first and second receivers, respectively; said first and said second input ports positioned adjacent said first and second receivers, respectively; both of said input ports being effectively closed by said splitter when the latter is at a center position; said first and said second control ports positioned to direct fluid flow therefrom transverse to said jet and direct the latter to said second and said first receivers, respectively; said splitter providing boundary portions for said receivers whereby said splitter is subjected to fluid flow resulting in a force acting to pivot the latter from said center position to project into said second receiver and to open said first input port when there is fluid flow in said first receiver and to project into said first receiver and to open said second input port when there is fluid flow in said second receiver; said splitter having its center of gravity positioned remote from said pivot; with said splitter in said center position said pivot, said center of gravity and said orifice disposed in a line transverse to said pivot whereby fluid flow from said jet into said receivers occurs in pulses of substantially equal durations for both of said receivers when said splitter is in said center position; with said accelerometer subjected to an acceleration component at right angles to said line and said pivot said splitter being caused to pivot by forces a accompanying said acceleration component whereby fluid flow from said jet into said receivers occurs in pulses related to magnitude of said acceleration component.

2. An accelerometer as set forth in claim 1 in which said pivot is positioned between said center of gravity and said orifice.

3. An accelerometer as set forth in claim 1 also including a divider interposed between said splitter and said orifice; said divider including a tip portion facing said orifice; said divider providing additional boundary portions for said receivers.

4. An accelerometer as set forth in claim 3 in which said boundary and said additional boundary portions for said first receiver confronting said first boundary wall; said boundary and said additional boundary portions for said second receiver confronting said second boundary wall.

5. An accelerometer as set forth in claim 4 wherein with said splitter in said center position each of said receivers is wider at its said additional boundary portion than at its said boundary portion.

6. An accelerometer as set forth in claim 4 in which said pivot is positioned between said center of gravity and said orifice.

7. An accelerometer as set forth in claim 6 in which the splitter is a plate-like member mounted for pivotal movement in the plane thereof.

8. An accelerometer as set forth in claim 7 in which said pivot is perpendicular to the plane of said member and extends beyond opposite surfaces thereof.

References Cited

UNITED STATES PATENTS

| | | | |
|---|---|---|---|
| 3,276,464 | 10/1966 | Metzger | 73—515 XR |
| 3,310,985 | 3/1967 | Belsterling et al. | 73—515 |

JAMES J. GILL, Primary Examiner.

U.S. Cl. X.R.

137—81.5